(12) United States Patent
Slotnick

(10) Patent No.: US 8,156,683 B2
(45) Date of Patent: Apr. 17, 2012

(54) WIRELESS RAT TRAP MOVEMENT DETECTION SYSTEM

(76) Inventor: David Slotnick, Bellevue, WA (US)

( * ) Notice: Subject to any disclaimer, the term of this patent is extended or adjusted under 35 U.S.C. 154(b) by 84 days.

(21) Appl. No.: 12/833,800

(22) Filed: Jul. 9, 2010

(65) Prior Publication Data

US 2011/0083358 A1    Apr. 14, 2011

Related U.S. Application Data

(60) Provisional application No. 61/224,217, filed on Jul. 9, 2009.

(51) Int. Cl.
*A01M 23/24* (2006.01)

(52) U.S. Cl. ............................................. 43/81

(58) Field of Classification Search .................. 43/81, 61
See application file for complete search history.

(56) References Cited

U.S. PATENT DOCUMENTS

| | | | | |
|---|---|---|---|---|
| 4,274,088 A | * | 6/1981 | Pierson et al. | 340/568.8 |
| 4,719,718 A | * | 1/1988 | Kon | 43/81 |
| 5,241,297 A | * | 8/1993 | Goodman | 340/568.8 |
| 5,477,635 A | * | 12/1995 | Orsano | 43/81 |
| 5,528,853 A | | 6/1996 | Dufaux et al. | |
| 6,137,415 A | | 10/2000 | Rast | |
| 6,445,301 B1 | | 9/2002 | Farrell et al. | |
| 6,775,946 B2 | * | 8/2004 | Wright | 43/61 |
| 6,865,843 B1 | | 3/2005 | Jordan, Sr. | |
| 7,026,942 B2 | | 4/2006 | Cristofori et al. | |
| 2003/0213161 A1 | | 11/2003 | Gardner, Jr. et al. | |
| 2009/0151221 A1 | * | 6/2009 | Daley | 43/58 |

* cited by examiner

*Primary Examiner* — Kimberly Berona
(74) *Attorney, Agent, or Firm* — Dean Craine

(57) ABSTRACT

A system and method of detecting and signaling the activation of a spring-loaded rat trap located at a remote location. The system includes a wireless transmitter mounted inside a transmitter unit upon which a spring loaded rat trap is placed. When a rat is caught by the trap, the rat drags the trap over the top surface of the transmitter unit causing activation of one or more switches located on the top surface. The switch is coupled to the wireless transmitter that sends a signal to a wireless receiving unit located in the vicinity. Coupled to the receiving unit is a light or sound alarm that is activated when a signal is received from the transmitter unit indicating that the trap has been moved over the transmitter unit. The system may be used with one or more transmitter units so that system may be used to monitor rat infestation one or multiple locations.

5 Claims, 7 Drawing Sheets

WIRELESS RAT TRAP MOVEMENT DETECTION SYSTEM

COPYRIGHT NOTICE

Notice is hereby given that the following patent document contains original material which is subject to copyright protection. The copyright owner has no objection to the facsimile or digital download reproduction of all or part of the patent document, but otherwise reserves all copyrights whatsoever.

This application is based on and claims the filing date benefit of U.S. Provisional patent application Ser. No. 61/224,217, filed on Jul. 9, 2009.

BACKGROUND OF THE INVENTION

1. Field of the Invention

This invention pertains to animal traps and more specifically, it pertains to wireless rat traps that transmit a signal to a remote receiver when movement of the trap over a support surface occurs.

2. Description of the Related Art

When a rat is caught by a spring-loaded trap, the rat instinctively tries to escape by using its rear legs to free itself. As the rat tries to free itself, the trap is pulled rearward before the rat dies.

Heretofore, rat traps that produce an audio signal when activated have been patented (See U.S. Pat. No. 6,137,415). One drawback with these traps is that the sound generated may be heard by other individuals alerting them that the area is infested with rats. Another drawback is that sound produced when activated may not be heard from a remote location. A trap that discreetly informs an operator in a private location that a rat has been caught is more desirable. Also, when multiple sound generating traps are used in a small area, identifying which particular trap has been activated can be difficult.

In a warehouse infested with rats, multiple rat traps are often deployed in different locations of the warehouse. In the prior art, a warehouse worker must visit the different areas on a regular basis to determine if a rat has been caught.

What is needed is a rat trap system that uses standard, inexpensive, spring-activated rat traps that can be set-up in different locations in a rat infested area that informs the operator when the trap has been activated.

SUMMARY OF THE INVENTION

It is an object of the present invention to provide a spring-loaded, rat trap movement detection system that detects and generates an alarm or notice when the trap has been moved.

It is another object of the present invention to provide such a system that can be used with multiple rat traps set-up in different locations in a rat infested area.

It is a further object of the present invention to provide such a system that uses wireless technology that allows the status of the traps to be monitored from a central location.

It is still a further object of the present invention to provide such a system that can be coupled to a local area network that communicates with traps in the rat infested area thereby enabling the operator to monitor the status of the traps via his or her computer or 'smart' cellphone.

These and other objects are met by the wireless trap movement detection system that includes one or more spring-loaded rat traps setup in an area known or believed to be infested with rats. The system includes a wireless transmitter mounted inside a transmitter unit placed in a rigid support surface in an area considered to be infested with rats. Positioned over the top surface of the transmitter unit is light-weight, spring-loaded rat trap. When a rat is caught by the trap, the movement of the spring causes the trap to move or the rat physically drags the trap over the top surface of the transmitter unit. Mounted on the top surface of the transmitter unit is a spring-loaded plunger switch. The plunger switch is located on the top surface so that when the trap is placed over the top surface of the transmitter unit, the plunger switch is forced downward into an OFF position. When the trap falls off or moves a short distance over the top surface of the transmitter unit, the plunger switch is released thereby enabling it to automatically move to an ON position. The plunger switch is coupled to the wireless transmitter located inside the transmitter unit. When the plunger switch is in the OFF position, the transmitter is either de-activated or continuously transmits a 'non-activated' code wireless signal. When the plunger switch is in the ON position, the transmitter is activated and begins transmitting an 'activate' code wireless signal.

The system also includes a wireless receiver located in the vicinity of the transmitter unit that monitors the area for a wireless signal from the wireless transmitter. In one embodiment, the wireless receiver is a stand alone unit setup in a monitoring location near the rat infested area. The wireless receiver is designed to communication exclusively with one or more transmitter units. When a signal is received from the transmitter unit, a light or sound indicator on the wireless receiver is activated that informs the operator that the trap on the transmitting unit has been moved. In one embodiment, the light or sound indicator on the wireless receiver is linked to one particular transmitter unit so that the operator may determine by viewing the activated lights or sounds which particular transmitter unit has been activated. In this embodiment, a network adaptor port and necessary software programs and drivers may be supplied with the wireless receiver that allows the wireless receiver to be connected to a network router, a desktop computer, or a laptop computer and monitored therewith.

In a second embodiment, an enhanced transmitter unit is used that is able to communication with a wireless router setup within the rat infested area. Accompanying the enhanced transmitter unit is a rat trap transmitter control software program that is loaded into the memory of a desktop or laptop computer that is able to connect to the local area network and the wireless router. The rat trap transmitter control software program is to program each transmitter unit so that it may communicate with the wireless router and join the local area network. During operation, the OFF or ON status of the plunger on the transmitter unit is communicated to the wireless router and then presented in a menu page on the desktop or laptop computer created by the rat transmitter control software program. The rat transmitter control software program may interface with an email program on the desktop or laptop computer so that when plunger is moved to the ON position, a notification is sent to the operator via his or her email account.

The system is designed so that the operator may monitor one trap or a plurality of traps. In the preferred embodiment, each transmitter unit is assigned an identification code that is recorded in the wireless receiver unit or on the rat transmitter software program that identifies the transmitter unit generating the activation code signal.

Because the system disclosed herein may interface with a local area network, the system may be easily adopted by pest control companies that hire individuals to monitor the traps in multiple locations.

DESCRIPTION OF THE PREFERRED EMBODIMENT(S)

Figure 1:
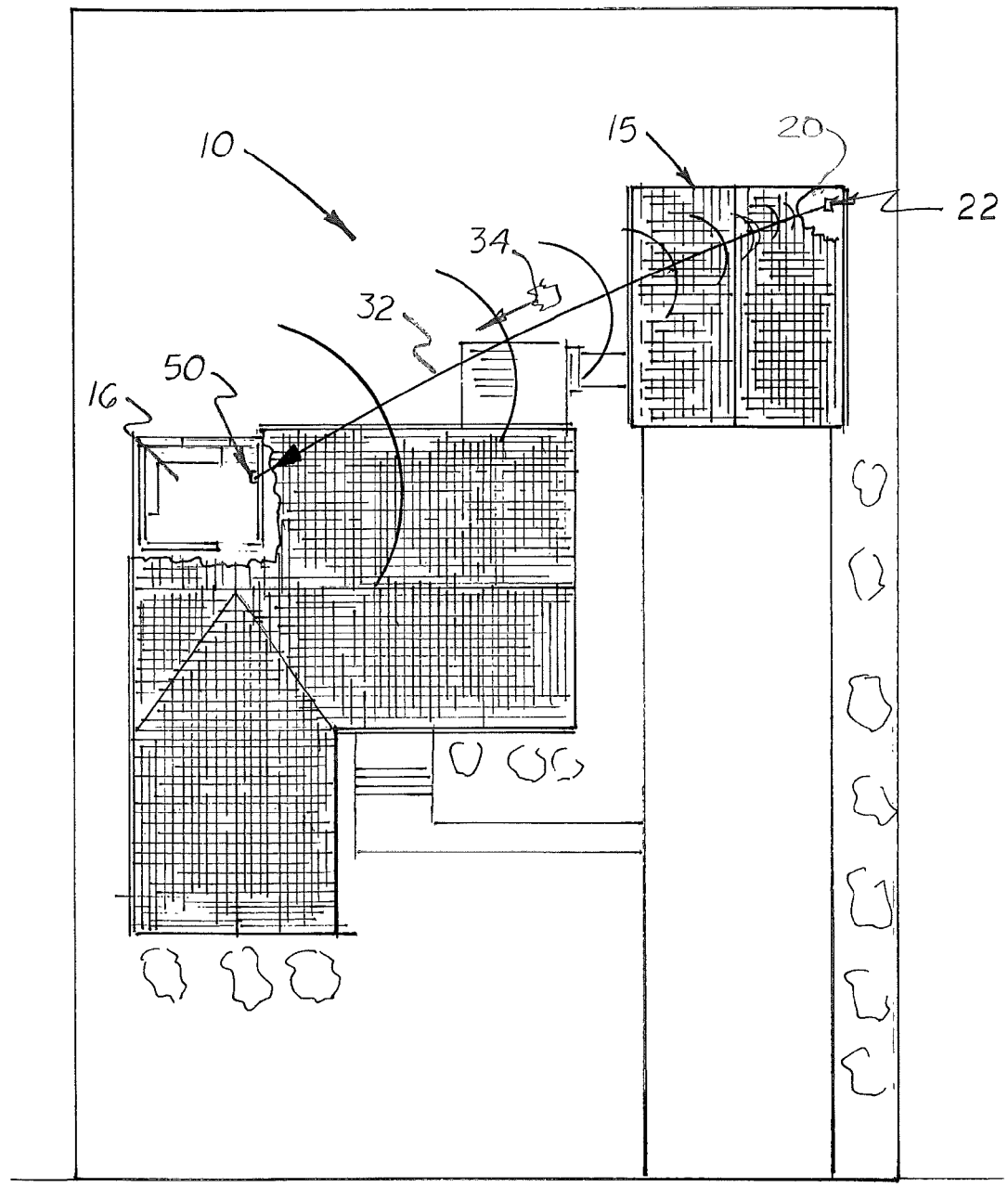
FIG. 1 is a diagram of a house with a detached garage showing the wireless trap system set-up with the receiver unit being located inside the house and the transmitting unit located inside the garage.
Figure 2:
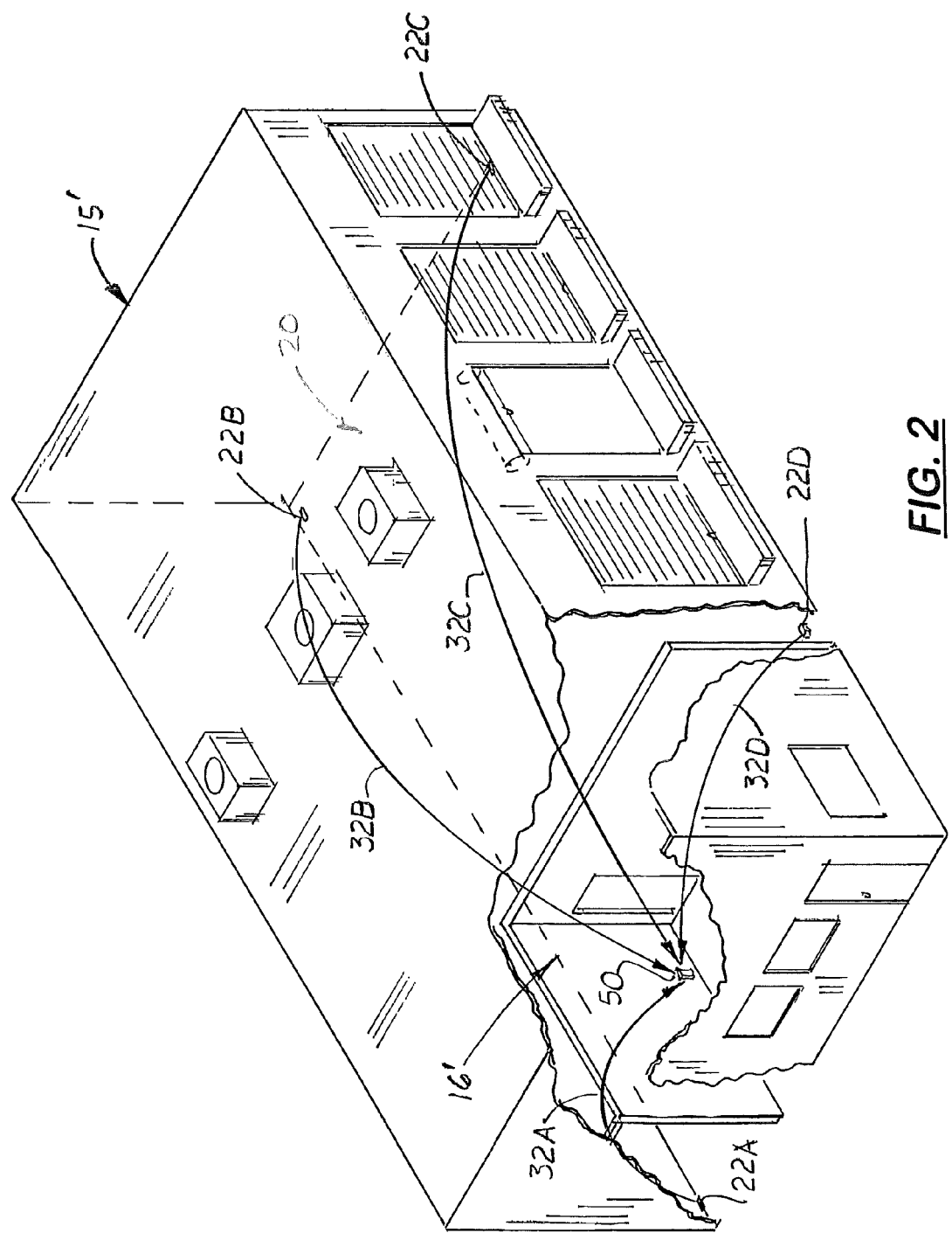
FIG. 2 is a diagram of a warehouse with the wireless trap system set-up therein with the receiver unit being located inside the main office and a plurality of transmitter units located in different locations inside the warehouse space.

Referring to the FIGS. 1-9, there is shown the wireless rat trap movement detection system 10 that includes a spring-loaded rat trap 12 positioned at a known or suspected rat infested location 20 of a small building (shown as a detached garage 15 in FIG. 1) or large building (shown as a warehouse 15' in FIG. 2). The system 10 includes a wireless transmitter 25 mounted inside a transmitter unit 22 on which a spring-activated rat trap 12 is placed. The transmitting unit 22 includes a rigid rectangular body 24 with a flat top surface 27 and a flat bottom surface 28.

Mounted on the top surface 27 of the body 24 is a spring-loaded, single pole momentary switch 29. The switch 29 includes a spring-loaded plunger 31 that is biased upward by a spring 33 and extends above the body's top surface 27. When a standard rat trap 12 is placed over the top surface 27, the weight of the trap 12 overcomes the biasing force of the spring 33 thereby retracting the plunger 31 inside the body 24. The switch 29 includes contacts (not shown) that cause the switch 29 to close when the plunger 31 extends upward from the body 24 and close when the plunger 31 retracts into the body 24. Mounted inside the body 24 is a PCB 35 with a wireless transmitter 25 integrally formed or mounted thereon. The transmitter 25 produces a wireless signal 32 containing an identifying code 34. The PCB 35 is connected either to internal batteries 37 or to an external electrical adapter 37' that provides a D.C. electric current to the PCB 28, the transmitter 25 and the switch 29. Mounted on the side of the body 25 is an optional manual switch 38 so that the transmitter Unit 22 may be selectively activated and de-activated.

Figure 4:
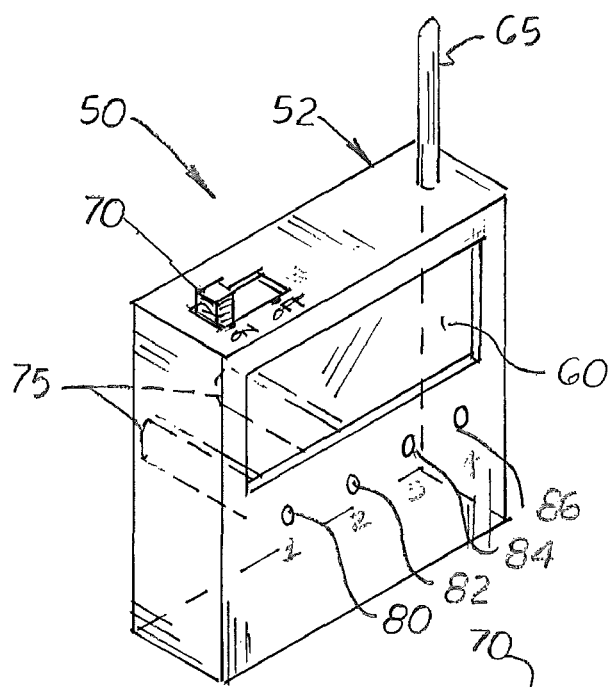
FIG. 4 is a perspective view of the receiving unit.
Figure 5:
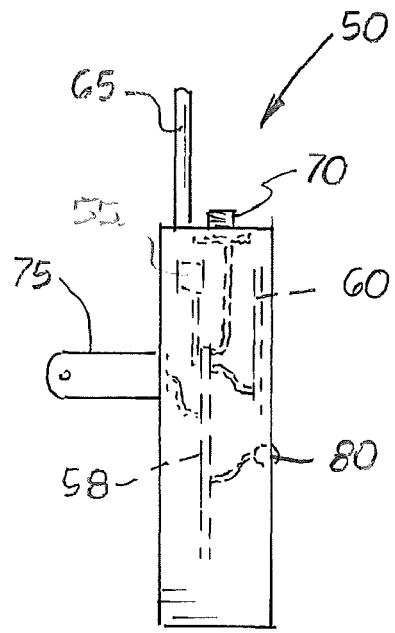
FIG. 5 is a side elevational view of the receiving unit.
Figure 6:
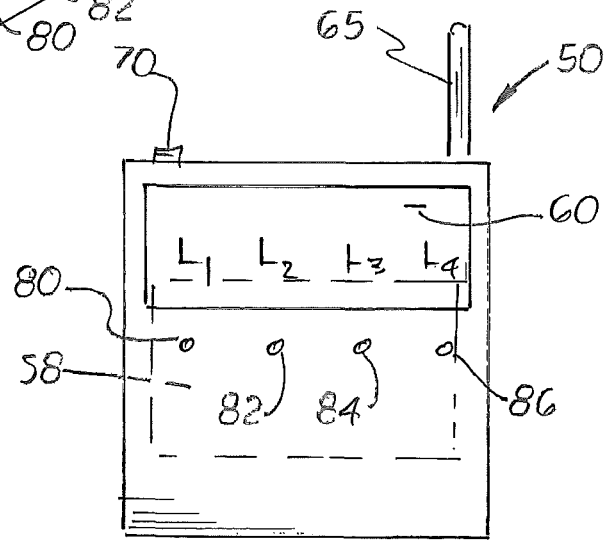
FIG. 6 is a front elevational view of the receiving unit.

The system 10 also includes a receiver unit 50 that is placed inside the monitoring area 16, 16' inside the house 15 or warehouse 15', respectively. In the monitoring area 16, 16', the status of the trap 12 located above the transmitter unit 22 is monitored by monitoring the status of the transmitter unit 22. As shown in FIGS. 4-6, the receiving unit 50 includes an outer housing 52 that contains a wireless receiver 55, an LCD display 60, an antenna 65, a manual ON/OFF switch 70, and an A.C. electric power source 75. In one embodiment, the receiver 55, the LCD display 60, the switch 70 and the A.C. electric power source 75 (a pair of electrical plugs) are connected to the PCB 58.

Mounted on the front face of the outer housing 52 is one or more indictors (80-86) that are aligned and registered with identification information (Numbers 1, 2, 3, and 4) also printed on the front face.

In one embodiment, the system 10 is designed for use by an operator who wishes to monitor one to four spring-loaded traps 12 in areas where rats visit or live. In another embodiment, the system 10 is designed for a large building (warehouse 15') where multiple traps 12A-12D are set-up. In both embodiments, the receiver unit 50 is able to receive multiple wireless signals 32A-32D from a plurality of wireless transmitter units 22A-22d, respectively. When one of the signals 32A-32D is detected, the indicator 80-86 that corresponds to the signal is activated, thus informing the operator that the spring-loaded trap 12 located over the transmitter unit 22A-22d has been sufficiently moved so that the plunger 31 is extended. The trap 12A-12D may then be visited and if necessary, reset.

Figure 3:
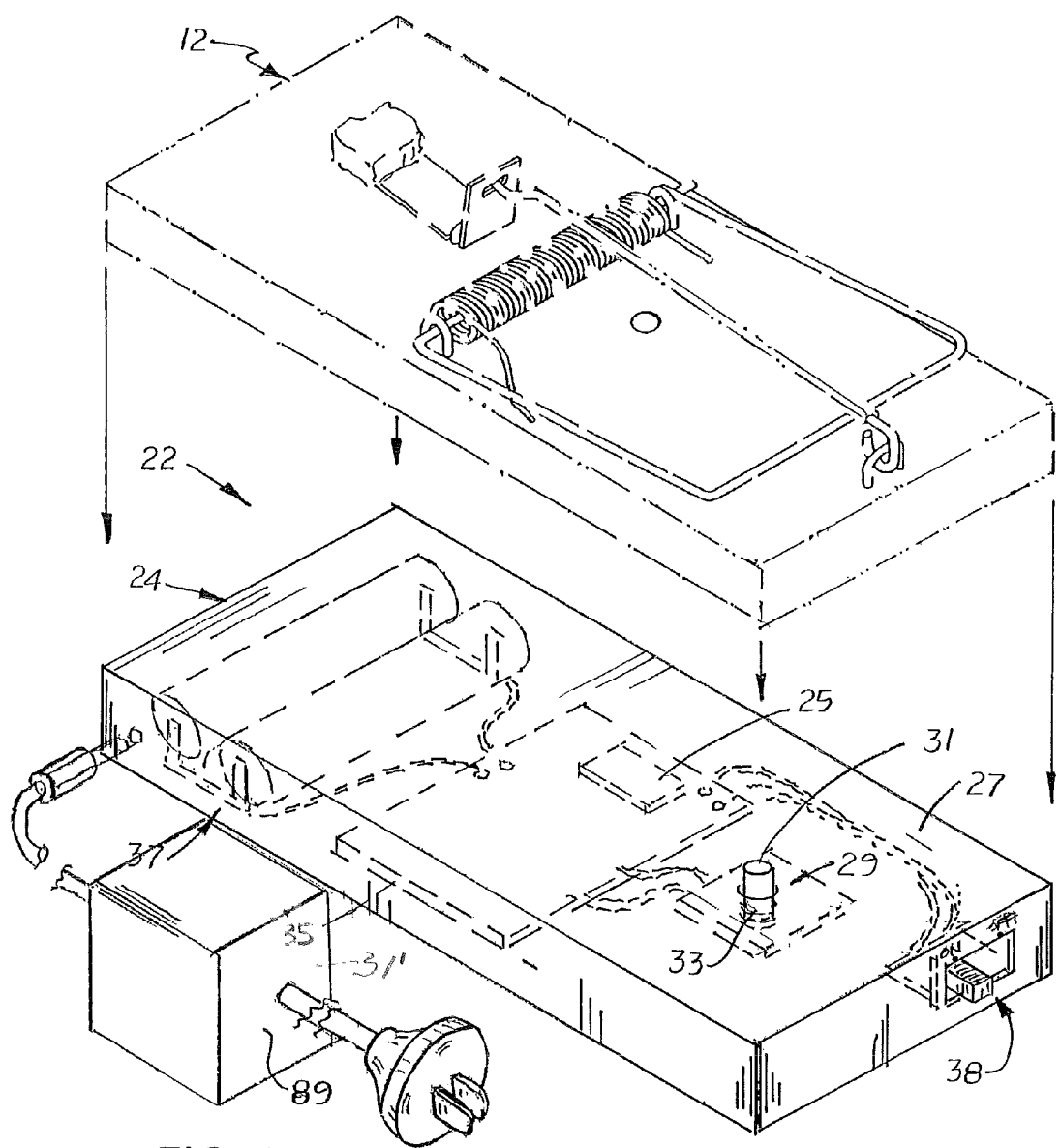
FIG. 3 is a perspective view of the transmitter unit shown being placed under a standard, spring-loaded rat trap.
Figure 7:
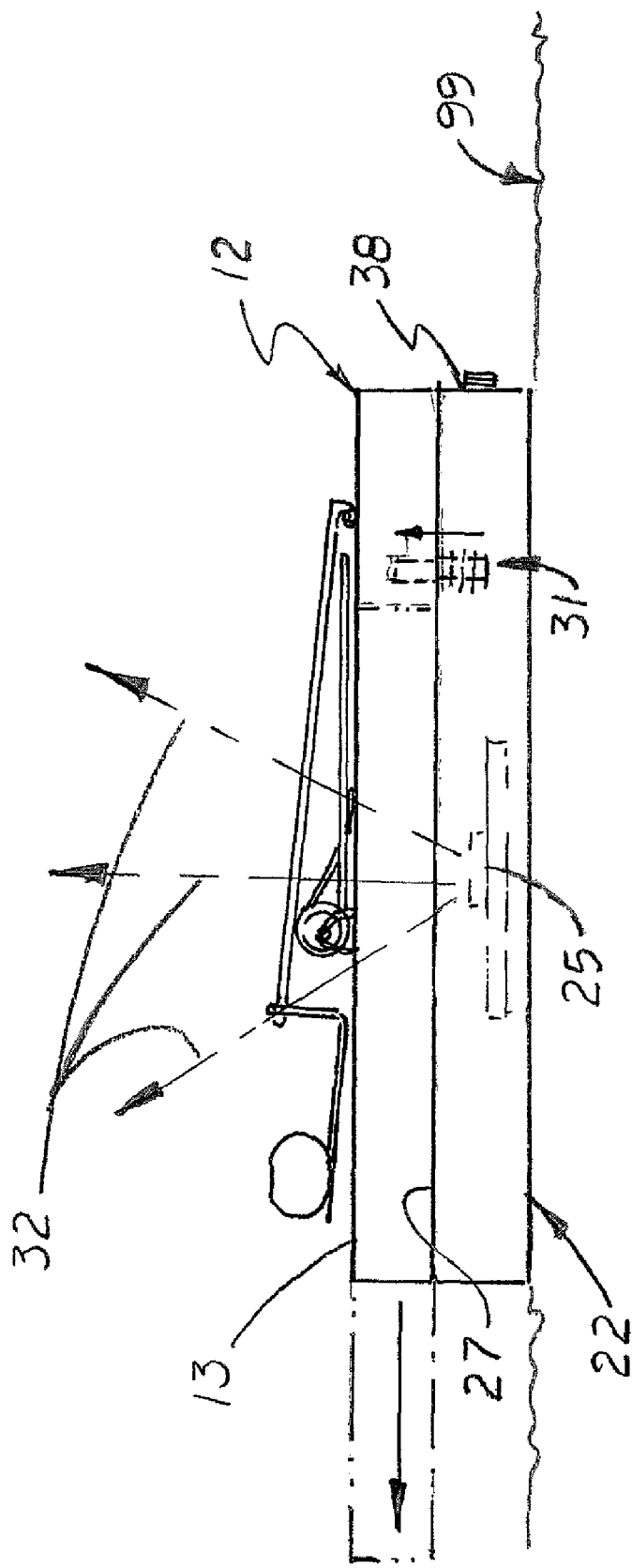
FIG. 7 is a side elevational view of the receiver unit showing the movement of the rat trap over the transmitting unit that causes the transmission switch on the receiving unit to move from a de-activated position to an activated position and transmit a wireless signal.

FIG. 7 is a side elevational view of the receiver unit 50 showing the movement of the spring-load rat trap 12 over the transmitter unit 22 that causes the plunger switch 29 on the transmitter unit 22 to move from an OFF position to an ON position and transmit a wireless signal 32. During set-up, the manual switch 38 on the receiving unit 50 is turned OFF. The receiver unit 50 is then placed on a rigid surface 99 with the top surface facing upward. A 'set and baited' spring-loaded rat trap 12 is then longitudinally aligned and registered over the unit's top surface 27 so that the trap's platform 13 extends over and presses the plunger 31 downward. The manual switch 38 is then manually moved to the ON position. As shown in FIG. 3, the plunger switch 29 and plunger 31 are located near one edge of the body 24. When the trap 12 is positioned over the body 24, the trap 12 is aligned so that when a rat is trapped, the trap's platform 13 only has to travel a short distance longitudinally over the body 24 to release the plunger 31. Research by the inventor indicates that when trapped, the rat's hind legs presses against the rigid surface, and the dynamic contraction of the rat's muscle pulls the platform 13 rearward over the top surface 27 of the transmitter unit 22. When the edge of the trap 12 clears the plunger 31, the plunger 31 is released and the plunger switch 29 causes transmission of a wireless signal 32 from the transmitter unit 22 which is received by the receiver 50 in the receiver unit 50.

Figure 8:
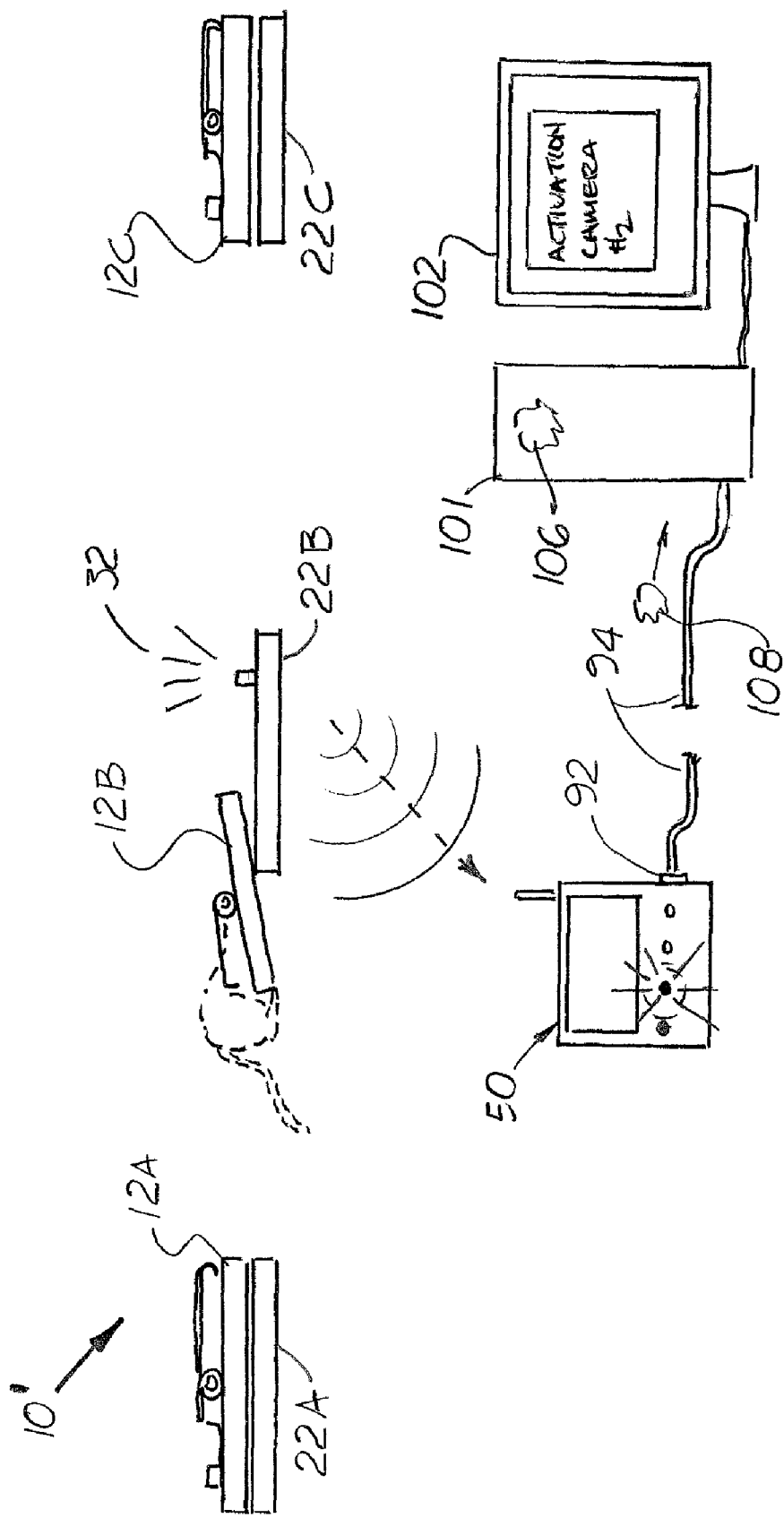
FIG. 8 is an illustration of the system showing the receiving unit communicating with three transmitter units and connected to desktop computer.

FIG. 8 is an illustration showing a second embodiment of the system, denoted 10', in which the receiver unit 50 communicates with three transmitter units 22A, 22B and 22C associated with traps 12A, 12B, 12C, respectively, and connected to a computer 101 with a display 102. The receiver unit 50 includes a network adaptor port 92 that connects via a cable 94 to the computer 101. Loaded into the working memory of the computer 101 is a receiving unit communication software program 106 that receives transmitter unit status information 108 from the receiver unit 50 and presents the information in a menu 110 shown on the display 102

Figure 9:
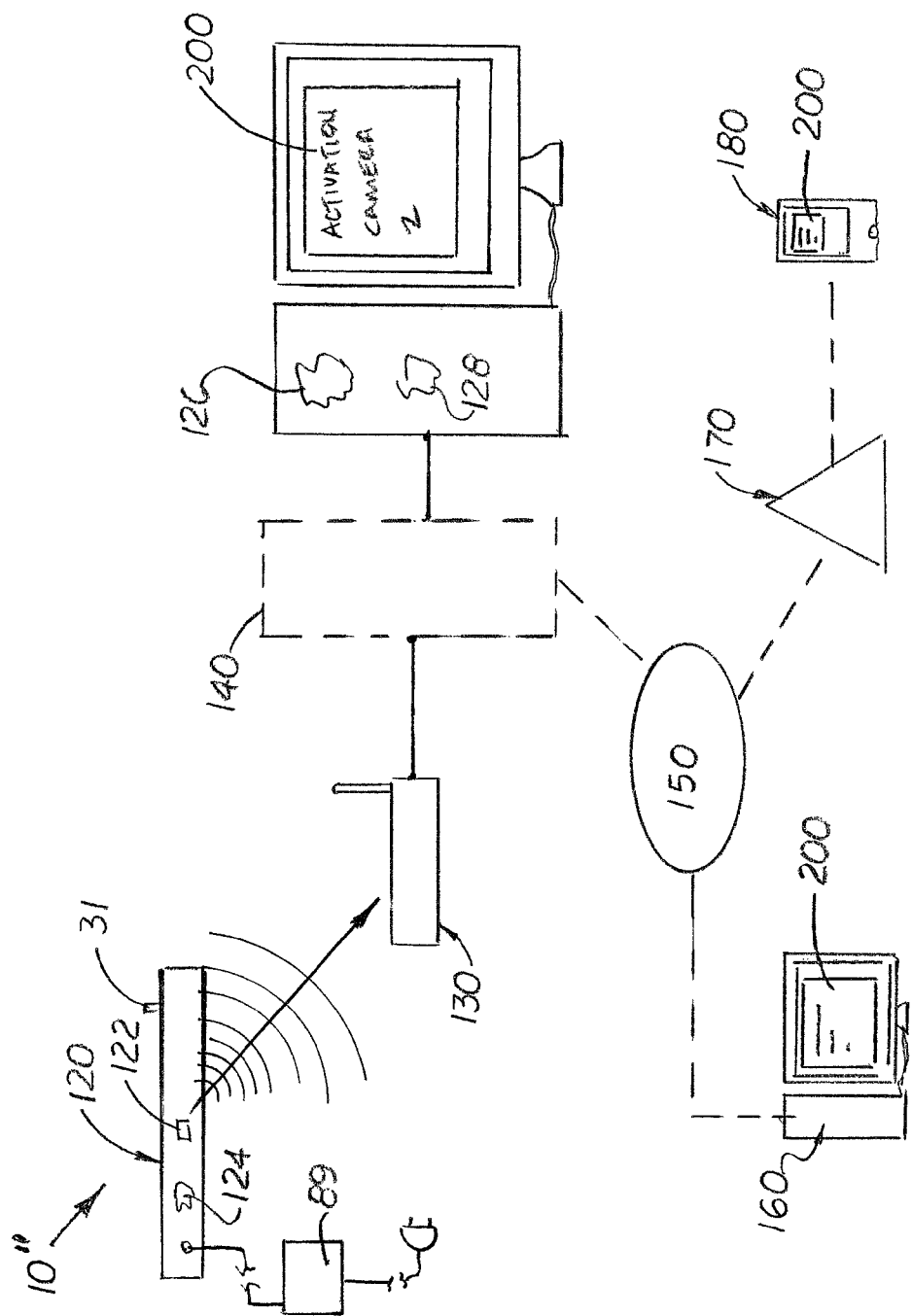
FIG. 9 is an illustration of the system showing the receiving unit communicating with an enhanced transmitter unit and a wireless router that enables local or remote desktop computers or smart phone to receive signals from the transmitter unit.

FIG. 9 is an illustration showing a third embodiment of the system, denoted 10", in which the transmitter unit 22 described above is replaced by an enhanced transmitter unit 120 that is able to communicate and transfer data to a wireless router 130 that connects to a local area network 140. Connected to the local area network 140 is a computer 101 with a display 102. The local area network 140 may be connected to a wide area computer network 150 (such as the World Wide Web) which enables remote computers 160 to communicate with the desktop computer 101 or directly with the enhanced transmitter unit 120. The system 10" may also include a smart cellular telephone 180 (with email, MMS or SMS service capabilities) that connects via a wireless telephone communication network 170, to the wide area network 150.

The enhanced transmitter unit 120 includes the same components used in the transmitter unit 22 but includes a wireless network adaptor 122 (IEEE 802.11 standard or similar standards) and programmable memory 124. Loaded in to the computer 101 is a transmitter unit communication software program 126 that enables the operator to configure the enhanced transmitter unit 120 to communicate with the wireless router 130 and join the local area network 140. Also loaded into the memory of the computer 101 is an email software program 128. During setup, the operator may used the transmitter unit communication software program 126 to configure the enhanced transmitter unit 120 a message 200 via the router130 and email software program 128 that the plunger 31 has been extended and moved to the ON position. The system 10" is especially useful for pest terminating companies which need to monitor the status of traps in multiple buildings or when the owner is away from the building and wants to be notified when a trap has been moved.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A system for remote detection of activation of a rat trap by detecting the physical movement of the rat trap by a rat when trapped, said system comprising:
   a. a rat trap with a flat trap platform and a triggered controlled, spring loaded bail mounted on its top surface;
   b. a transmitter unit that includes a body with a flat top surface upon which said trap platform of said rat trap is placed, said body includes an upward extending biased plunger switch located on said top surface and configured to automatically retract into said body when said trap platform is placed on said top surface of said body and automatically extend from said body when said trap platform is moved a sufficient distance over said top surface to enable said plunger switch to move to a non-blocking position;
   c. a wireless transmitter mounted on or inside said body of said transmitter unit and coupled to said plunger switch so that a unique identifiable wireless signal is transmitted when said trap platform is moved a sufficient distance and allow said plunger switch to extended from said body thereby;
   d. a wireless receiver unit that includes a body with a wireless receiver located therein, said wireless receiver configured to receive said unique identifiable wireless signal from said wireless transmitter, said wireless receiver unit includes at least one illuminating indicator which is illuminated when said wireless signal is received from said transmitter unit; and,
   e. an electric current source connected to said transmitter unit and said plunger.

2. The system recited in claim 1, wherein said plunger switch on said transmitter unit is located in an off-set position on said top surface of said body so that said trap platform on said trap when placed thereon needs to move no more than one-half the length of said body of said transmitter unit to allow said plunger switch to extend from said body and activate said transmitter unit.

3. The system as recited in claim 2, wherein said transmitter unit includes a manual switch that enables said transmitter to be selectively activated or deactivated.

4. The system as recited in claim 1, further including a computer connected to said receiving unit and a receiving unit software program loaded into said computer, when said receiving unit receives a wireless signal from said transmitter unit indicating that said plunger has been extended, said receiver unit software program displays the information on the computer.

5. A wireless rat trap movement detection system, comprising:
   a. a rat trap with a flat trap platform and a triggered controlled, spring-loaded bail mounted on its top surface;
   b. a transmitter unit that includes a body with a top surface substantially the same size as said trap platform on said rat trap, said body includes a top surface with a biased plunger switch that automatically retracts into said body when said trap platform of said trap is placed on said top surface of said body and automatically extends from said body when said trap platform on said trap is moved to a non-blocking position over said top surface;
   c. a wireless transmitter mounted on or inside said body of said transmitter unit and coupled to said plunger switch, said transmitter unit configured to produce a unique identifiable wireless signal when said plunger switch has extended from said body;
   d. at least one battery mounted in said body of said transmitting unit and connected to said plunger switch and said wireless transmitter;
   e. a manual ON/OFF switch mounted on said body of said transmitter unit and connected to said wireless transmitter;
   f. a wireless receiver unit that includes a wireless receiver configured to receive wireless signals from said wireless transmitter, said wireless receiver unit includes at least one illuminating indicator which is illuminated when said wireless signal is received from said transmitter unit; and,
   g. an electricity source connected to said wireless receiver unit.

* * * * *